United States Patent
Ko et al.

(10) Patent No.: US 8,194,778 B2
(45) Date of Patent: Jun. 5, 2012

(54) METHOD FOR TRANSMITTING DATA IN MULTIPLE ANTENNA SYSTEM

(75) Inventors: Hyun Soo Ko, Anyang-si (KR); Jin Young Chun, Anyang-si (KR); Moon Il Lee, Anyang-si (KR); Bin Chul Ihm, Anyang-si (KR); Wook Bong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/056,635

(22) PCT Filed: Jul. 29, 2009

(86) PCT No.: PCT/KR2009/004235
§ 371 (c)(1),
(2), (4) Date: Jan. 28, 2011

(87) PCT Pub. No.: WO2010/013950
PCT Pub. Date: Feb. 4, 2010

(65) Prior Publication Data
US 2011/0135033 A1      Jun. 9, 2011

Related U.S. Application Data

(60) Provisional application No. 61/084,622, filed on Jul. 30, 2008, provisional application No. 61/154,424, filed on Feb. 22, 2009.

(30) Foreign Application Priority Data

May 15, 2009    (KR) .................. 10-2009-0042773

(51) Int. Cl.
*H04B 7/02*    (2006.01)

(52) U.S. Cl. ......................... 375/267; 375/299
(58) Field of Classification Search .............. 375/260, 375/267, 296, 299
See application file for complete search history.

(56) References Cited

U.S. PATENT DOCUMENTS

| 7,881,395 B2 | 2/2011 | Lee et al. |
| 7,961,808 B2 | 6/2011 | Ihm et al. |
| 2005/0129138 A1 | 6/2005 | Vaananen et al. |
| 2006/0039489 A1 | 2/2006 | Ikram et al. |

(Continued)

FOREIGN PATENT DOCUMENTS

| KR | 10-2007-0113941 | 11/2007 |
| KR | 1020080026010 | 3/2008 |
| KR | 10-2008-0036499 | 4/2008 |
| KR | 10-2008-0039711 | 5/2008 |
| WO | 03-021795 A2 | 3/2003 |
| WO | 2005-076758 A2 | 8/2005 |
| WO | 2008-044830 A1 | 4/2008 |

*Primary Examiner* — David B. Lugo
(74) *Attorney, Agent, or Firm* — Lee, Hong, Degerman, Kang & Waimey

(57) ABSTRACT

A method of sending data in a multiple antenna system includes the steps of generating a transmission signal by applying channel-dependent precoding to a first antenna cluster and a second antenna cluster, each comprising a plurality of antennas, wherein the channel-dependent precoding is performed by a precoding weight matrix in which a precoding weight for each of the antenna clusters has a block diagonal form and the precoding weight is represented by P×V for a number of transmission antennas P, included in each of the antenna clusters, and a number of layers V applied to each of the antenna clusters (P and V are an integer greater than 0) and sending the transmission signal.

9 Claims, 4 Drawing Sheets

U.S. PATENT DOCUMENTS

| | | |
|---|---|---|
| 2007/0189151 A1 | 8/2007 | Pan et al. |
| 2008/0049709 A1 | 2/2008 | Pan et al. |
| 2008/0080459 A1 | 4/2008 | Kotecha et al. |
| 2008/0080634 A1 | 4/2008 | Kotecha et al. |
| 2008/0094281 A1 | 4/2008 | Teng et al. |
| 2008/0095258 A1 | 4/2008 | She et al. |
| 2008/0198946 A1 | 8/2008 | Lee et al. |
| 2008/0260058 A1 | 10/2008 | Li |
| 2009/0006518 A1* | 1/2009 | Rensburg et al. .............. 708/520 |
| 2009/0274230 A1* | 11/2009 | Heath et al. ................... 375/260 |
| 2010/0284484 A1 | 11/2010 | Jongren et al. |
| 2011/0058621 A1* | 3/2011 | Clerckx et al. ................ 375/267 |

* cited by examiner

METHOD FOR TRANSMITTING DATA IN MULTIPLE ANTENNA SYSTEM

CROSS-REFERENCE TO RELATED APPLICATIONS

This application is a 371 U.S. national stage application of International Application No. PCT/KR2009/004235, filed on Jul. 29, 2009, which claims priority to Korean Application No. 10-2009-0042773, filed on May 15, 2009, and U.S. Provisional Application Serial Nos. 61/154,424, filed on Feb. 22, 2009, and 61/084,622, filed on Jul. 30, 2008, the contents of which are incorporated by reference herein in their entirety.

TECHNICAL FIELD

The present invention relates to wireless communication, and more specifically to a method of sending data using multiple antennas.

BACKGROUND ART

A Multiple-Input Multiple-Output (MIMO) has recently been in the spotlight in order to maximize the performance and communication capacity of a wireless communication system. MIMO technology is a method which breaks away from technology using one transmission antenna and one reception antenna and can improve the transmission efficiency of transmission/reception data by adopting multiple transmission antennas and multiple reception antennas. An MIMO system is also called a multiple antenna system. MIMO technology is the application of technology for gathering and completing data pieces received by several antennas without being dependent on a single antenna path in order to receive one entire message. Consequently, the data transfer rate may be improved in a specific range or the range of a system for a specific data transfer rate may be increased.

MIMO technology includes a transmission diversity, spatial multiplexing, beamforming, and so on. The transmission diversity is technology for sending the same data through multiple transmission antennas in order to increase transmission reliability. The spatial multiplexing is technology for sending data at high speed without increasing the bandwidth of a system by sending different data through multiple transmission antennas at the same time. The beamforming is used to increase the Signal to Interference plus Noise Ratio (SINR) of a signal by applying a weight according to a channel state in multiple antennas. The weight may be represented by a weight vector or a weight matrix and called a precoding vector or a precoding matrix.

The spatial multiplexing includes spatial multiplexing for a single user and spatial multiplexing for multiple users. The spatial multiplexing for a single user is called a Single User MIMO (SU-MIMO), and the spatial multiplexing for multiple users is called Spatial Division Multiple Access (SDMA) or a Multi-User MIMO (MU-MIMO). The capacity of an MIMO channel is increased in proportion to the number of antennas. An MIMO channel may be divided into independent channels. Assuming that the number of transmission antennas is Nt and the number of reception antennas is Nr, the number of independent channels Ni is $N \leq \min\{Nt, Nr\}$. Each of the independent channels may be said to be a spatial layer. A rank is the number of non-zero eigenvalues of an MIMO channel matrix and may be defined as the number of spatial streams that can be multiplexed.

MIMO technology includes a codebook-based precoding scheme. The codebook-based precoding scheme is a method of selecting a precoding matrix which is the most similar to an MIMO channel, from among predetermined precoding matrices, and sending a Precoding Matrix Index (PMI). This method can reduce the overhead of feedback data. A codebook consists of codebook sets which can represent spatial channels. In order to increase the data transfer rate, the number of antennas has to be increased. With an increase of the number of antennas, a codebook has to consist of a more number of codebook sets. If the number of codebook sets increases according to the increased number of antennas, not only the overhead of feedback data may be increased, but also there is a difficulty in designing the codebook.

There is a need for a method to which a codebook-based precoding scheme can be efficiently applied in a multiple antenna system having an increased number of antennas as compared with the existing number of antennas.

DISCLOSURE

Technical Problem

An object to be achieved by the present invention is to provide a method capable of efficiently applying a codebook-based precoding scheme to multiple increased antennas.

Technical Solution

A method of sending data in a multiple antenna system according to an aspect of the present invention includes the steps of generating a transmission signal by applying channel-dependent precoding to a first antenna cluster and a second antenna cluster, each comprising a plurality of antennas, wherein the channel-dependent precoding is performed by a precoding weight matrix in which a precoding weight for each of the antenna clusters has a block diagonal form and the precoding weight is represented by P×V for a number of transmission antennas P, included in each of the antenna clusters, and a number of layers V applied to each of the antenna clusters (P and V are an integer greater than 0) and sending the transmission signal.

A method of a User Equipment (UE) operating in a multiple antenna system according to another aspect of the present invention includes the steps of estimating a plurality of transmission antenna channels of a Base Station (BS), feeding a channel-dependent precoding matrix or a Precoding Matrix Index (PMI) for a first cluster and a second cluster, comprising a plurality of different antennas, from the estimated channels to the BS, and receiving precoded and transmitted data using the feedback precoding matrix or a precoding weight induced from the PMI or directly used.

Advantageous Effects

The existing codebook can be utilized with respect to multiple antennas more increased than the antennas of the existing multiple antenna system. Accordingly, the complexity of a system can be reduced, and backward compatibility for a user equipment not supporting multiple increased antennas can be guaranteed.

MODE FOR INVENTION

Figure 1:
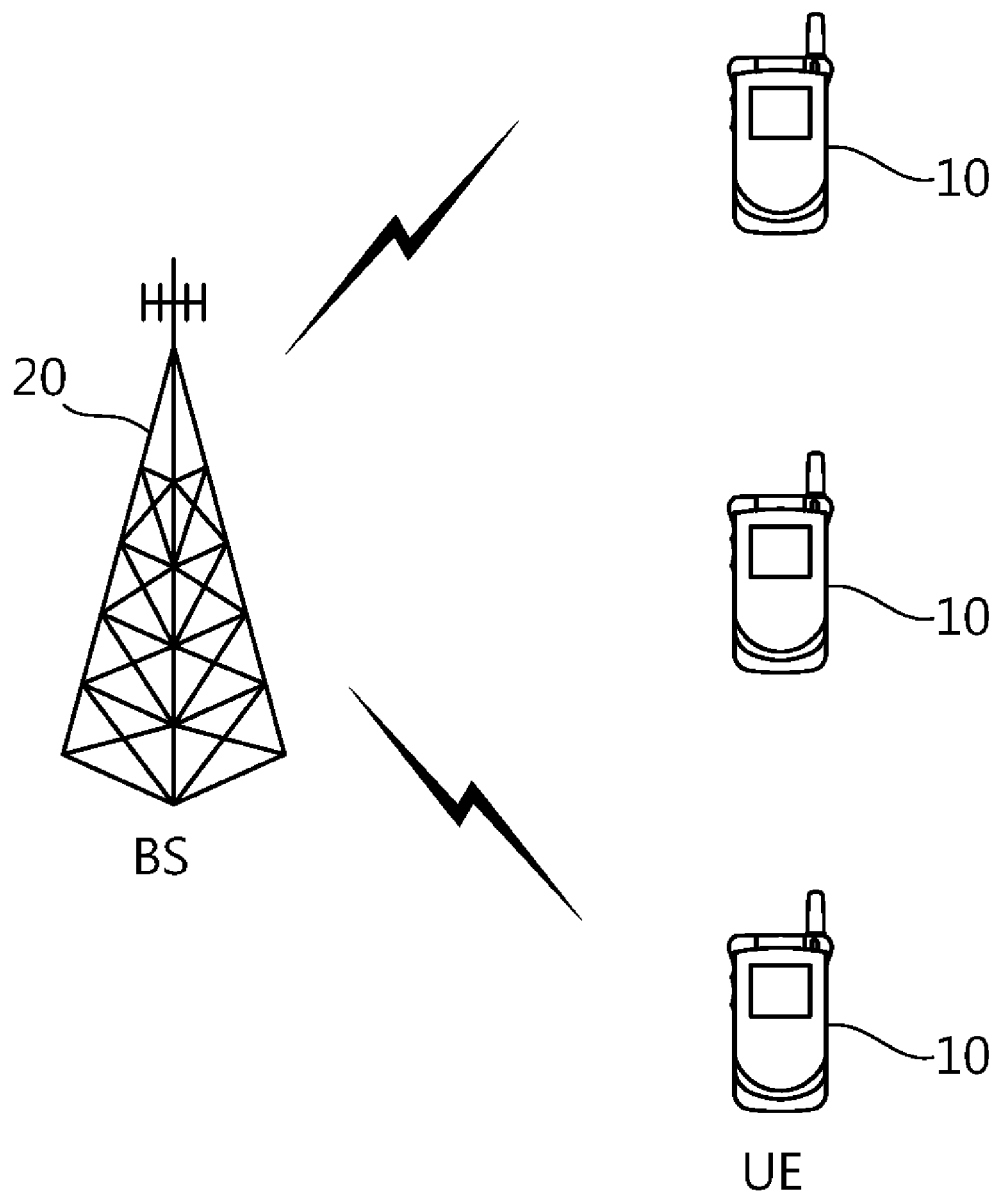
FIG. 1 is a block diagram showing a wireless communication system.

FIG. 1 is a block diagram showing a wireless communication system. The wireless communication systems are widely deployed in order to provide various communication services, such as voice and packet data.

Referring to FIG. 1, the wireless communication system includes User Equipment (UE) 10 and a Base Station (BS) 20. The UE 10 may be fixed or mobile and called another terminology, such as a Mobile Station (MS), a User Terminal (UT), a Subscriber Station (SS), or a wireless device. In general, the BS 20 refers to a fixed station communicating with the UEs 10, and it may be called another terminology, such as a Node-B, a Base Transceiver System (BTS), or an access point. One or more cells may exist in one BS 20.

Hereinafter, downlink (DL) refers to communication from the BS 20 to the UE 10, and uplink (UL) refers to communication from the UE 10 to the BS 20. In downlink, a transmitter may be part of the BS 20, and a receiver may be part of the UE 10. In uplink, a transmitter may be part of the UE 10, and a receiver may be part of the BS 20.

The wireless communication system may be an Orthogonal Frequency Division Multiplexing (OFDM)/Orthogonal Frequency Division Multiple Access (OFDMA)-based system. OFDM employs a plurality of orthogonal subcarriers. OFDM employs an orthogonality characteristic between Inverse Fast Fourier Transform (IFFT) and Fast Fourier Transform (FFT). A transmitter performs IFFT on data and sends the data. A receiver restores original data by performing FFT on a reception signal. The transmitter uses IFFT in order to combine multiple subcarriers, and the receiver uses corresponding FFT in order to separate multiple subcarriers.

The Wireless Communication System May be a Multiple Antenna System

The multiple antenna system may be a Multiple-Input Multiple-Output (MIMO) system. Alternatively, the multiple antenna system may be a Multiple-Input Single-Output (MISO) system, a Single-Input Single-Output (SISO) system, or a Single-Input Multiple-Output (SIMO) system. The MIMO system uses a plurality of transmission antennas and a plurality of reception antennas. The MISO system uses a plurality of transmission antenna and one reception antenna. The SISO system uses one transmission antenna and one reception antenna. The SIMO system uses one transmission antenna and a plurality of reception antenna.

In the multiple antenna system, Space-Time Coding (SPC), such as Space Frequency Block Codes (SFBC) and Space Time Block Codes (STBC), Cyclic Delay Diversity (CDD), Frequency Switched Transmit Diversity (FSTD), and Time Switched Transmit Diversity (TSTD) may be used as a scheme using multiple antennas at rank 1. Spatial Multiplexing (SM), Generalized Cyclic Delay Diversity (GCDD), and Selective Virtual Antenna Permutation (S-VAP) may be used as a scheme using multiple antennas at rank 2 or higher. SFBC is a scheme capable of securing both a diversity gain and a multiple user scheduling gain in a corresponding dimension by efficiently applying selectivity in the space region and the frequency domain. STBC is a scheme for applying selectivity in the space region and the time domain. FSTD is a scheme for classifying signals, transmitted through multiple antennas, according to frequencies. TSTD is a scheme for classifying signals, transmitted through multiple antennas, according to time. Spatial multiplexing is a scheme for raising the transmission rate by sending different data per antenna. GCDD is a scheme for selectivity in the time domain and the frequency domain. S-VAP is a scheme using a single precoding matrix, and it includes a Multi Codeword (MCW) S-VAP in which multiple codewords are mixed between antennas in spatial diversity or spatial multiplexing and a Single Codeword (SCW) S-VAP using a single codeword.

Figure 2:
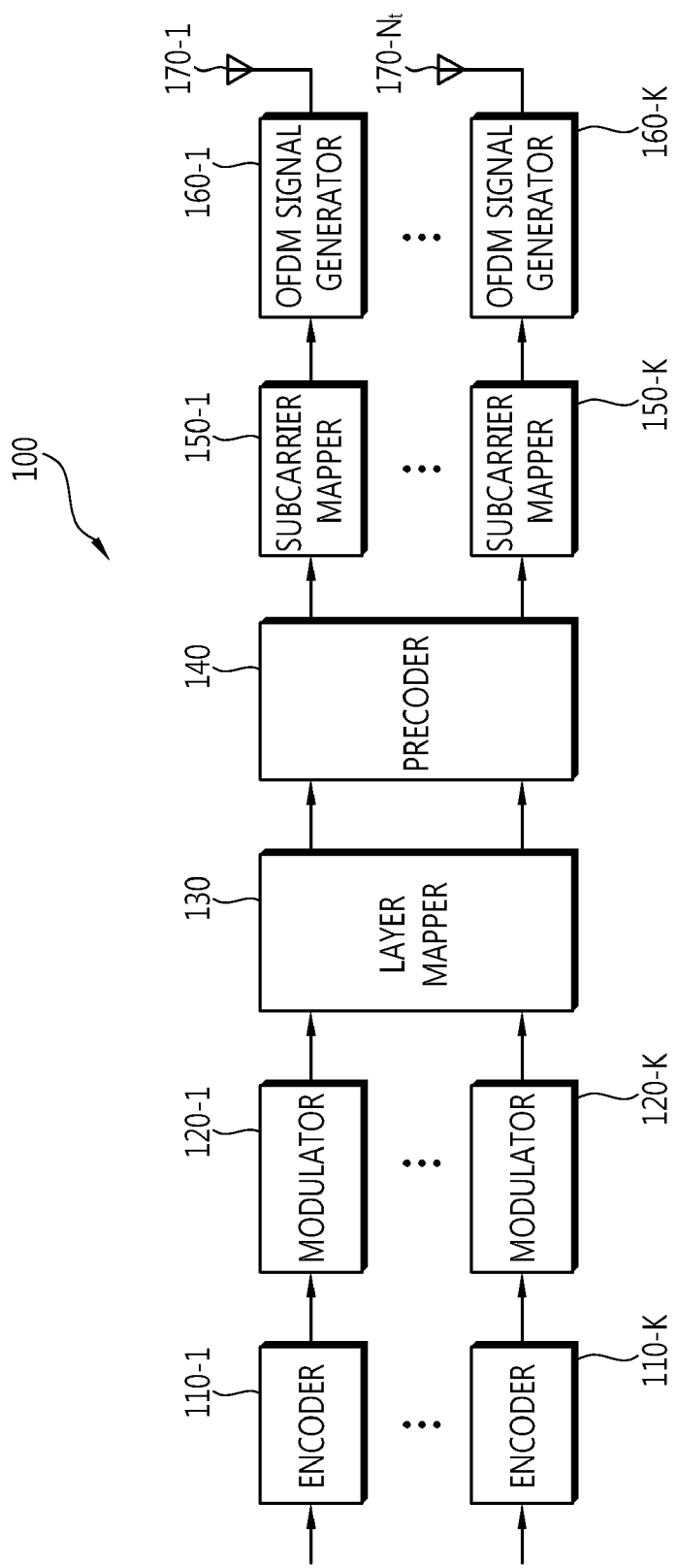
FIG. 2 shows an example of a transmitter structure.

FIG. 2 shows an example of a transmitter structure.

Referring to FIG. 2, the transmitter 100 includes encoders 110-1 to 110-K, modulators 120-1 to 120-K, a layer mapper 130, a precoder 140, subcarrier mappers 150-1 to 150-K, and OFDM signal generators 160-1 to 160-K. The transmitter 100 includes an Nt (Nt≧1) number of transmission antennas 170-1 to 170-Nt.

The encoders 110-1 to 110-K form coded data by encoding received data according to a predetermined coding scheme. The coded data may be called a codeword, and a codeword b may be represented by Equation 1 below.

$$b^{(q)}(0), \ldots, b^{(q)}(M_{bit}^{(q)}-1) \qquad \text{[Equation 1]}$$

wherein q is the index of a codeword, and $M_{bit}^{(q)}$ is the number of bits of the codeword q.

The codeword is subjected to scrambling. A scrambled codeword c may be represented by Equation 2.

$$c^{(q)}(0), \ldots, c^{(q)}(M_{bit}^{(q)}-1) \qquad \text{[Equation 2]}$$

The modulators 120-1 to 120-K arrange the codeword in the form of symbols which represent locations on a signal constellation. The modulation scheme is not limited and may be m-Phase Shift Keying (m-PSK) or m-Quadrature Amplitude Modulation (m-QAM). For example, the m-PSK may be BPSK, QPSK, or 8-PSK, and the m-QAM may be 16-QAM, 64-QAM, or 256-QAM.

The codeword d arranged in the form of the symbols on the signal constellation may be represented by Equation 3.

$$d^{(q)}(0), \ldots, d^{(q)}(M_{symb}^{(q)}-1) \qquad \text{[Equation 3]}$$

wherein $M_{symb}^{(q)}$ is the number of symbol of the codeword q.

The layer mapper 130 defines the layer of an input symbol such that the precoder 140 can distribute antenna-specific symbols to the path of each antenna. The layer is defined as information path to the precoder 140. A symbol x inputted to the path of each antenna may be represented by Equation 4.

$$x(i)=[x^{(0)}(i) \ldots x^{(\upsilon-1)}(i)]^T \qquad \text{[Equation 4]}$$

wherein υ indicates the number of layers.

Information path anterior to the precoder 140 may be called a virtual antenna or layer. The precoder 140 processes the input symbols according to the MIMO scheme according to the multiple transmission antennas 170-1 to 170-Nt. For example, the precoder 140 may use codebook-based precoding. The precoder 140 distributes the antenna-specific symbols into the subcarrier mappers 150-1 to 150-K of the path of a corresponding antenna. Each piece of information path transmitted from the precoder 140 to one antenna through one subcarrier mapper is called a stream. This may be called a physical antenna.

A signal $y^{(p)}(i)$ sent to each antenna port p may be represented by Equation 5.

$$y(i)=[\ldots y^{(p)}(i) \ldots]^T \qquad \text{[Equation 5]}$$

The subcarrier mappers 150-1 to 150-K allocate the input symbols to proper subcarriers and multiplex the input symbols according to a user. The OFDM signal generators 160-1 to 160-K modulate the input symbols according to an OFDM scheme and output OFDM symbols. The OFDM signal generators 160-1 to 160-K may perform IFFT (Inverse Fast Fourier Transform) on the input symbols, and a Cyclic Prefix (CP) may be inserted into a time domain symbol on which IFFT has been performed. The OFDM symbols are transmitted through the respective transmission antennas 170-1 to 170-Nt.

In the MIMO system, the transmitter 100 may be operated in two kinds of modes. One of the two kinds of modes is an SCW mode, and the other thereof is an MCW mode. In the SCW mode, transmission signals transmitted through MIMO channels have the same data rate. In the MCW mode, data transmitted through MIMO channels may be independently coded, and transmission signals may have different data rates. The MCW mode is operated when the rank is 2 or higher.

Figure 3:
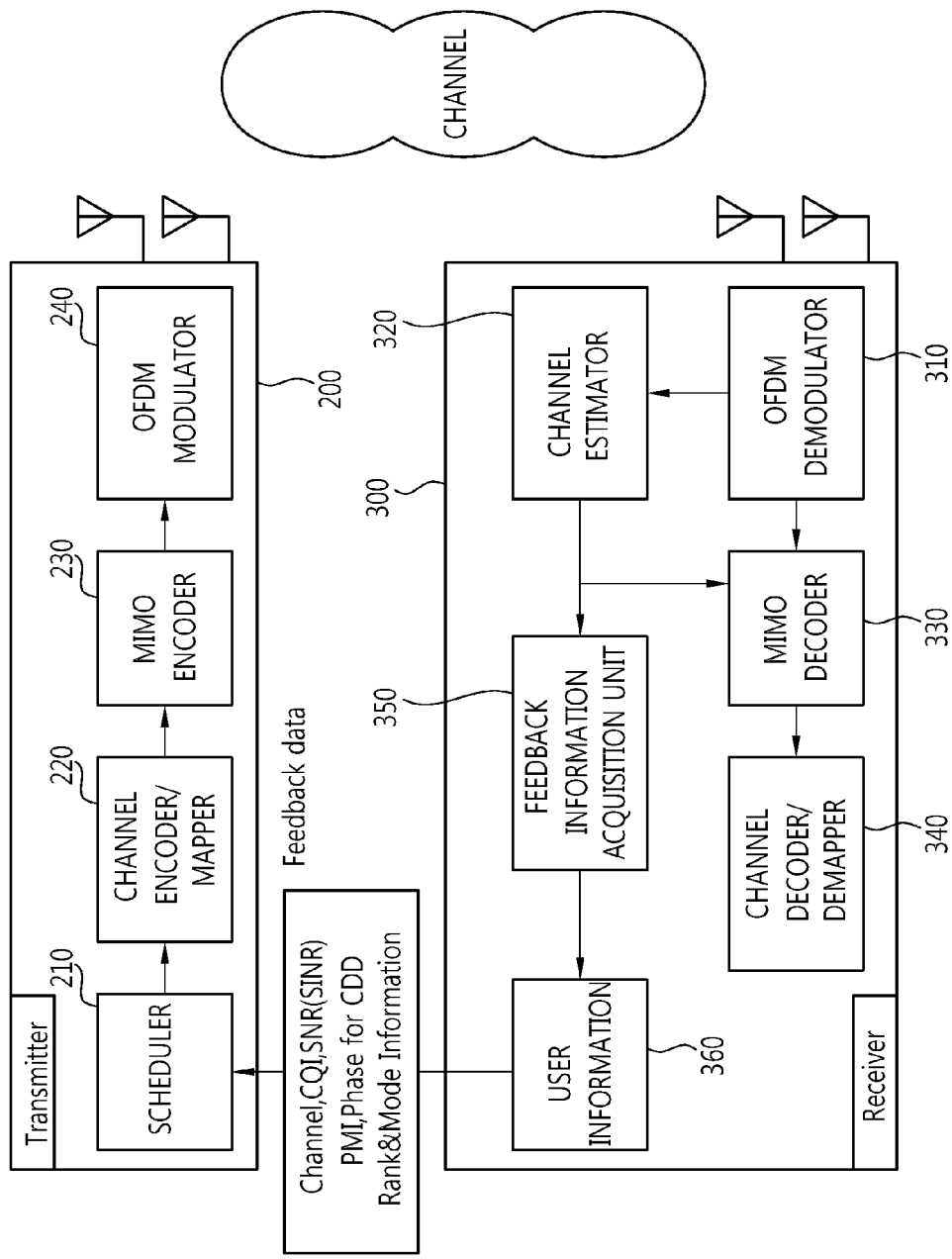
FIG. 3 shows data processing between a transmitter and a receiver in a multiple antenna system.

FIG. 3 shows data processing between a transmitter and a receiver in a multiple antenna system.

Referring to FIG. 3, the transmitter 200 includes a scheduler 210, a channel encoder/mapper 220, an MIMO encoder 230, and an OFDM modulator 240. The transmitter 200 includes an Nt (Nt>1) number of transmission antennas. The transmitter 200 may be part of a BS in downlink and may be part of a UE in uplink.

The scheduler 210 receives data from an N number of users and outputs a K number of streams to be transmitted at once. The scheduler 210 determines a user to which available radio resources will be transmitted and the transmission rate on the basis of channel information of each user. The scheduler 210 extracts channel information from feedback data and selects a code rate, a Modulation and Coding Scheme (MCS) and so on. For the operation of an MIMO system, the feedback data may include pieces of control information, such as a Channel Quality Indicator (CQI), Channel State Information (CSI), a channel covariance matrix, a precoding weight, and a channel rank. The CSI includes a channel matrix, a channel correlation matrix, a quantized channel matrix, or a quantized channel correlation matrix between a transmitter and a receiver. The CQI includes a Signal to Noise Ratio (SNR), a Signal to Interference and Noise Ratio (SINR), etc. between a transmitter and a receiver.

Available radio resources allocated by the scheduler indicate radio resources used when data is transmitted in a wireless communication system. For example, in a Time Division Multiple Access (TDMA) system, each time slot is resources. In a Code Division Multiple Access (CDMA) system, each code and each time slot are resources. In an Orthogonal Frequency Division Multiple Access (OFDMA) system, each subcarrier and each time slot are resources. In order not to cause interference with other users within the same cell or sector, each resource may be orthogonally defined in the time, code, or frequency domain.

The channel encoder/mapper 220 forms coded data by encoding received streams according to a predetermined coding scheme and maps the coded data to symbols which represent locations on a signal constellation. The MIMO encoder 230 performs precoding on the received symbols. Such precoding is a scheme for preprocessing symbols to be transmitted. The precoding scheme includes RBF (random beamforming), ZFBF (zero forcing beamforming), etc. which generate symbols using a weight vector or a precoding matrix. Codebook-based precoding using predetermined codebook sets may be used as the precoding scheme.

The OFDM modulator 240 allocates the received symbols to proper subcarriers and sends the subcarriers through the transmission antennas.

The receiver 300 includes an OFDM demodulator 310, a channel estimator 320, an MIMO decoder 330, a channel decoder/demapper 340, and a feedback information acquisition unit 350. The receiver 300 includes an Nr (Nr>1) number of reception antennas. The receiver 300 may be part of a UE in downlink and part of a BS in uplink.

Signals received from the reception antennas are demodulated by the OFDM demodulator 310. The channel estimator 320 estimates channels. The MIMO decoder 330 performs post processing corresponding to the MIMO encoder 230. The decoder/demapper 340 demaps the received symbols into coded data and restores original data by decoding the coded data. The feedback information acquisition unit 350 generates user information 360, including CSI, CQI, a PMI, and so on. The generated user information 360 is composed of feedback data and transmitted to the transmitter 200.

<Feedback Data of an MIMO-OFDM System>

For the operation of an MIMO-OFDM system, pieces of control information, such as a CQI, CSI, a channel covariance matrix, a precoding weight, and a channel rank, are required. In a Frequency Division Duplex (FDD) system, a receiver reports the pieces of information through feedback channels. In a Time Division Duplex (TDD) system, pieces of information to be used for downlink transmission may be acquired by estimating uplink channels using the reciprocity characteristic of a channel.

The CQI is necessary for the allocation of resources and link adaptation. An SNR, an SINR, etc. may be used as the CQI. The SNR/SINR may be quantized in 16 levels of a 1.89 dB interval and defined as a 4-bit CQI. The receiver quantizes the SNR/SINR and reports a defined CQI index to the transmitter. Furthermore, when an MIMO scheme is used, a maximum of 2 codewords (CW) may be supported. That is, for rank 2 or higher transmission, the CQIs of a first CW and a second CW have to be reported to the transmitter. The first CW may be represented by 4 bits, and the second CW may be represented by 3 bits as a difference with the first CW.

The precoding scheme is an MIMO scheme for preprocessing and sending transmission data strings using a preprocessing weight. Equation 6 represents a precoding scheme for preprocessing a transmission data string x using a preprocessing weight.

$$\begin{bmatrix} y^{(0)}(i) \\ \vdots \\ y^{(P-1)}(i) \end{bmatrix} = W(i) \begin{bmatrix} x^{(0)}(i) \\ \vdots \\ x^{(v-1)}(i) \end{bmatrix} \text{ where, } i = 0, 1, \ldots, M_{symb}^{layer}$$ [Equation 6]

wherein W(i) indicates a precoding matrix. A preprocessed transmission data string y may employ a diversity matrix D(i) and a DFT matrix U for Cyclic Delay Diversity (CDD) as in Equation 7.

$$\begin{bmatrix} y^{(0)}(i) \\ \vdots \\ y^{(P-1)}(i) \end{bmatrix} = W(i)D(i)U \begin{bmatrix} x^{(0)}(i) \\ \vdots \\ x^{(v-1)}(i) \end{bmatrix}$$ [Equation 7]

D(i) and U may be determined according to a transmission layer.

Equation 8 shows an example in which a precoding matrix W(i) according to the rank is generated.

$$W(i) = C_k$$ [Equation 8]
$$k = \left(\left\lfloor \frac{i}{v} \right\rfloor \mod 4\right) + 1, \text{ where } k = 1, 2, 3, 4.$$

wherein C1, C2, C3, and C4 indicate precoding matrices corresponding to respective precoder indices 12, 13, 14, and 15. u indicates a rank (transmission layer).

Table 1 shows an example of a delay matrix D(i) and a DFT matrix. U for CDD (cyclic delay diversity) which is applied according to the transmission layer.

TABLE 1

| Number of layers v) | U | D(i) |
|---|---|---|
| 2 | $\frac{1}{\sqrt{2}}\begin{bmatrix} 1 & 1 \\ 1 & e^{-j2\pi/2} \end{bmatrix}$ | $\begin{bmatrix} 1 & 0 \\ 0 & e^{-j2\pi i/2} \end{bmatrix}$ |
| 3 | $\frac{1}{\sqrt{3}}\begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ | $\begin{bmatrix} 1 & 0 & 0 \\ 0 & e^{-j2\pi i/3} & 0 \\ 0 & 0 & e^{-j4\pi i/3} \end{bmatrix}$ |
| 4 | $\frac{1}{2}\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ | $\begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix}$ |

There are zero forcing beamforming, eigen beamforming, and codebook-based precoding according to a method of generating the precoding weight. In order to apply each of the schemes, a CSI, a channel covariance matrix, a codebook index, etc. are required. In the existing system, codebook-based precoding is supported in two antennas (2Tx) and four antenna (4Tx) MIMO transmission. To this end, codebooks for 2Tx/4Tx are defined.

In the codebook-based precoding scheme, a receiver has several predetermined precoding matrices, estimates channels using a signal received from a transmitter, and determines a precoding matrix which is the most similar to an estimated channel state. The receiver feeds a determined PMI back to the transmitter. The transmitter selects a codebook suitable for the feedback precoding matrix and sends data. In the codebook-based precoding scheme, the amount of the feedback data is greatly reduced because only the PMI is transmitted. The codebook-based precoding scheme has a different system performance according to a method of configuring a codebook, the type of the codebook, and the size of the codebook. In the codebook-based precoding scheme, if a codebook does not sufficiently represent a channel state, performance may be deteriorated. However, if the size of a codebook is increased, the codebook can sufficiently represent a channel state and thus may approach optimal performance. Accordingly, there is a need for a design of a codebook which can approach optimal performance while sufficiently reducing the amount of feedback data.

With an increase of the number of transmission antennas, the size of a required codebook is increased. In 2Tx transmission of the existing system, a codebook having four precoding matrices for a rank 1 and a codebook having three precoding matrices for a rank 2 are defined. In 4Tx transmission of the existing system, a codebook having 16 precoding matrices for each of ranks 1 to 4 is defined. Table 2 shows an example of a codebook for 4Tx MIMO.

TABLE 2

| Codebook Index | Number of Layers | | | |
|---|---|---|---|---|
| | 1 | 2 | 3 | 4 |
| 0 | $\begin{bmatrix} 1 \\ 1 \\ 1 \\ 1 \end{bmatrix}$ | $\frac{1}{\sqrt{2}}\begin{bmatrix} 1 & 1 \\ 1 & -1 \\ 1 & -1 \\ 1 & 1 \end{bmatrix}$ | $\frac{1}{\sqrt{3}}\begin{bmatrix} 1 & 1 & 1 \\ 1 & 1 & -1 \\ 1 & -1 & -1 \\ 1 & -1 & 1 \end{bmatrix}$ | $\frac{1}{\sqrt{4}}\begin{bmatrix} 1 & 1 & 1 & 1 \\ 1 & 1 & -1 & -1 \\ 1 & -1 & 1 & -1 \\ 1 & -1 & -1 & 1 \end{bmatrix}$ |
| 1 | $\begin{bmatrix} 1 \\ -j \\ -1 \\ j \end{bmatrix}$ | $\frac{1}{\sqrt{2}}\begin{bmatrix} 1 & j \\ -j & 1 \\ -1 & j \\ j & 1 \end{bmatrix}$ | $\frac{1}{\sqrt{3}}\begin{bmatrix} 1 & j & -1 \\ -j & 1 & -j \\ -1 & j & 1 \\ j & 1 & j \end{bmatrix}$ | $\frac{1}{\sqrt{4}}\begin{bmatrix} 1 & j & -1 & -j \\ -j & 1 & -j & 1 \\ -1 & j & 1 & -j \\ j & 1 & j & 1 \end{bmatrix}$ |
| 2 | $\begin{bmatrix} 1 \\ -1 \\ 1 \\ -1 \end{bmatrix}$ | $\frac{1}{\sqrt{2}}\begin{bmatrix} 1 & -1 \\ -1 & 1 \\ 1 & 1 \\ -1 & -1 \end{bmatrix}$ | $\frac{1}{\sqrt{3}}\begin{bmatrix} 1 & -1 & 1 \\ -1 & 1 & 1 \\ 1 & 1 & 1 \\ -1 & 1 & 1 \end{bmatrix}$ | $\frac{1}{\sqrt{4}}\begin{bmatrix} 1 & -1 & 1 & -1 \\ -1 & 1 & 1 & -1 \\ 1 & 1 & 1 & 1 \\ -1 & -1 & 1 & 1 \end{bmatrix}$ |
| 3 | $\begin{bmatrix} 1 \\ j \\ -1 \\ -j \end{bmatrix}$ | $\frac{1}{\sqrt{2}}\begin{bmatrix} 1 & -j \\ j & 1 \\ -1 & -j \\ j & 1 \end{bmatrix}$ | $\frac{1}{\sqrt{3}}\begin{bmatrix} 1 & -j & -1 \\ j & 1 & j \\ -1 & -j & 1 \\ -j & 1 & -j \end{bmatrix}$ | $\frac{1}{\sqrt{4}}\begin{bmatrix} 1 & -j & -1 & j \\ j & 1 & j & 1 \\ -1 & -j & 1 & j \\ -j & 1 & -j & 1 \end{bmatrix}$ |

TABLE 2-continued

| Codebook Index | Number of Layers | | | |
|---|---|---|---|---|
| | 1 | 2 | 3 | 4 |
| 4 | $\begin{bmatrix} 1 \\ \frac{1-j}{\sqrt{2}} \\ -j \\ \frac{-1-j}{\sqrt{2}} \end{bmatrix}$ | $\frac{1}{\sqrt{2}}\begin{bmatrix} 1 & \frac{-1+j}{\sqrt{2}} \\ \frac{1-j}{\sqrt{2}} & -j \\ -j & \frac{-1-j}{\sqrt{2}} \\ \frac{-1-j}{\sqrt{2}} & 1 \end{bmatrix}$ | $\frac{1}{\sqrt{3}}\begin{bmatrix} 1 & \frac{1+j}{\sqrt{2}} & \frac{-1+j}{\sqrt{2}} \\ \frac{1-j}{\sqrt{2}} & 1 & -j \\ -j & \frac{-1+j}{\sqrt{2}} & \frac{-1-j}{\sqrt{2}} \\ \frac{-1-j}{\sqrt{2}} & j & 1 \end{bmatrix}$ | $\frac{1}{\sqrt{4}}\begin{bmatrix} 1 & \frac{1+j}{\sqrt{2}} & j & \frac{-1+j}{\sqrt{2}} \\ \frac{1-j}{\sqrt{2}} & 1 & \frac{-1-j}{\sqrt{2}} & -j \\ -j & \frac{-1+j}{\sqrt{2}} & 1 & \frac{-1-j}{\sqrt{2}} \\ \frac{-1-j}{\sqrt{2}} & j & \frac{-1+j}{\sqrt{2}} & 1 \end{bmatrix}$ |
| 5 | $\begin{bmatrix} 1 \\ \frac{-1-j}{\sqrt{2}} \\ j \\ \frac{1-j}{\sqrt{2}} \end{bmatrix}$ | $\frac{1}{\sqrt{2}}\begin{bmatrix} 1 & \frac{1+j}{\sqrt{2}} \\ \frac{-1-j}{\sqrt{2}} & j \\ j & \frac{1-j}{\sqrt{2}} \\ \frac{1-j}{\sqrt{2}} & 1 \end{bmatrix}$ | $\frac{1}{\sqrt{3}}\begin{bmatrix} 1 & \frac{-1+j}{\sqrt{2}} & \frac{1+j}{\sqrt{2}} \\ \frac{-1-j}{\sqrt{2}} & 1 & j \\ j & \frac{1+j}{\sqrt{2}} & \frac{1-j}{\sqrt{2}} \\ \frac{1-j}{\sqrt{2}} & -j & 1 \end{bmatrix}$ | $\frac{1}{\sqrt{4}}\begin{bmatrix} 1 & \frac{-1+j}{\sqrt{2}} & -j & \frac{1+j}{\sqrt{2}} \\ \frac{-1-j}{\sqrt{2}} & 1 & \frac{1-j}{\sqrt{2}} & j \\ j & \frac{1+j}{\sqrt{2}} & 1 & \frac{1-j}{\sqrt{2}} \\ \frac{1-j}{\sqrt{2}} & -j & \frac{1+j}{\sqrt{2}} & 1 \end{bmatrix}$ |
| 6 | $\begin{bmatrix} 1 \\ \frac{-1+j}{\sqrt{2}} \\ -j \\ \frac{1+j}{\sqrt{2}} \end{bmatrix}$ | $\frac{1}{\sqrt{2}}\begin{bmatrix} 1 & j \\ \frac{-1+j}{\sqrt{2}} & \frac{1+j}{\sqrt{2}} \\ -j & 1 \\ \frac{1+j}{\sqrt{2}} & \frac{1-j}{\sqrt{2}} \end{bmatrix}$ | $\frac{1}{\sqrt{3}}\begin{bmatrix} 1 & j & \frac{1-j}{\sqrt{2}} \\ \frac{-1+j}{\sqrt{2}} & \frac{1+j}{\sqrt{2}} & -j \\ -j & 1 & \frac{1+j}{\sqrt{2}} \\ \frac{1+j}{\sqrt{2}} & \frac{1-j}{\sqrt{2}} & 1 \end{bmatrix}$ | $\frac{1}{\sqrt{4}}\begin{bmatrix} 1 & \frac{-1-j}{\sqrt{2}} & j & \frac{1-j}{\sqrt{2}} \\ \frac{1+j}{\sqrt{2}} & 1 & \frac{1+j}{\sqrt{2}} & -j \\ -j & \frac{1-j}{\sqrt{2}} & 1 & \frac{1+j}{\sqrt{2}} \\ \frac{1+j}{\sqrt{2}} & j & \frac{1-j}{\sqrt{2}} & 1 \end{bmatrix}$ |
| 7 | $\begin{bmatrix} 1 \\ \frac{1+j}{\sqrt{2}} \\ j \\ \frac{-1+j}{\sqrt{2}} \end{bmatrix}$ | $\frac{1}{\sqrt{2}}\begin{bmatrix} 1 & -j \\ \frac{1+j}{\sqrt{2}} & \frac{-1+j}{\sqrt{2}} \\ j & 1 \\ \frac{-1+j}{\sqrt{2}} & \frac{-1-j}{\sqrt{2}} \end{bmatrix}$ | $\frac{1}{\sqrt{3}}\begin{bmatrix} 1 & -j & \frac{-1-j}{\sqrt{2}} \\ \frac{1+j}{\sqrt{2}} & \frac{-1+j}{\sqrt{2}} & j \\ j & 1 & \frac{-1+j}{\sqrt{2}} \\ \frac{-1+j}{\sqrt{2}} & \frac{-1-j}{\sqrt{2}} & 1 \end{bmatrix}$ | $\frac{1}{\sqrt{4}}\begin{bmatrix} 1 & \frac{1-j}{\sqrt{2}} & -j & \frac{-1-j}{\sqrt{2}} \\ \frac{1+j}{\sqrt{2}} & 1 & \frac{-1+j}{\sqrt{2}} & j \\ j & \frac{-1-j}{\sqrt{2}} & 1 & \frac{-1+j}{\sqrt{2}} \\ \frac{-1+j}{\sqrt{2}} & -j & \frac{-1-j}{\sqrt{2}} & 1 \end{bmatrix}$ |
| 8 | $\begin{bmatrix} 1 \\ 1 \\ -1 \\ -1 \end{bmatrix}$ | $\frac{1}{\sqrt{2}}\begin{bmatrix} 1 & 1 \\ 1 & 1 \\ -1 & 1 \\ -1 & 1 \end{bmatrix}$ | $\frac{1}{\sqrt{3}}\begin{bmatrix} 1 & 1 & -1 \\ 1 & 1 & 1 \\ -1 & 1 & -1 \\ -1 & 1 & 1 \end{bmatrix}$ | $\frac{1}{\sqrt{4}}\begin{bmatrix} 1 & 1 & -1 & -1 \\ 1 & 1 & 1 & 1 \\ -1 & 1 & 1 & -1 \\ -1 & 1 & -1 & 1 \end{bmatrix}$ |
| 9 | $\begin{bmatrix} 1 \\ -j \\ 1 \\ -j \end{bmatrix}$ | $\frac{1}{\sqrt{2}}\begin{bmatrix} 1 & j \\ -j & -1 \\ 1 & -j \\ -j & 1 \end{bmatrix}$ | $\frac{1}{\sqrt{3}}\begin{bmatrix} 1 & 1 & j \\ -j & j & -1 \\ 1 & 1 & -j \\ -j & j & 1 \end{bmatrix}$ | $\frac{1}{\sqrt{4}}\begin{bmatrix} 1 & j & 1 & j \\ -j & 1 & j & -1 \\ 1 & -j & 1 & -j \\ -j & -1 & j & 1 \end{bmatrix}$ |
| 10 | $\begin{bmatrix} 1 \\ -1 \\ -1 \\ 1 \end{bmatrix}$ | $\frac{1}{\sqrt{2}}\begin{bmatrix} 1 & -1 \\ -1 & -1 \\ -1 & 1 \\ 1 & 1 \end{bmatrix}$ | $\frac{1}{\sqrt{3}}\begin{bmatrix} 1 & -1 & -1 \\ -1 & 1 & -1 \\ -1 & -1 & 1 \\ 1 & 1 & 1 \end{bmatrix}$ | $\frac{1}{\sqrt{4}}\begin{bmatrix} 1 & -1 & -1 & 1 \\ -1 & 1 & -1 & 1 \\ -1 & -1 & 1 & 1 \\ 1 & 1 & 1 & 1 \end{bmatrix}$ |
| 11 | $\begin{bmatrix} 1 \\ j \\ 1 \\ j \end{bmatrix}$ | $\frac{1}{\sqrt{2}}\begin{bmatrix} 1 & 1 \\ j & -j \\ 1 & 1 \\ j & -j \end{bmatrix}$ | $\frac{1}{\sqrt{3}}\begin{bmatrix} 1 & 1 & -j \\ j & -j & -1 \\ 1 & 1 & j \\ j & -j & 1 \end{bmatrix}$ | $\frac{1}{\sqrt{4}}\begin{bmatrix} 1 & -j & 1 & -j \\ j & 1 & -j & -1 \\ 1 & j & 1 & j \\ j & -1 & -j & 1 \end{bmatrix}$ |

TABLE 2-continued

| Codebook Index | Number of Layers | | | |
|---|---|---|---|---|
| | 1 | 2 | 3 | 4 |
| 12 | $\begin{bmatrix} 1 \\ 1 \\ 1 \\ -1 \end{bmatrix}$ | $\frac{1}{\sqrt{2}}\begin{bmatrix} 1 & 1 \\ 1 & 1 \\ 1 & -1 \\ -1 & 1 \end{bmatrix}$ | $\frac{1}{\sqrt{3}}\begin{bmatrix} 1 & 1 & 1 \\ 1 & 1 & -1 \\ 1 & -1 & 1 \\ -1 & 1 & 1 \end{bmatrix}$ | $\frac{1}{\sqrt{4}}\begin{bmatrix} 1 & 1 & 1 & -1 \\ 1 & 1 & -1 & 1 \\ 1 & -1 & 1 & 1 \\ -1 & 1 & 1 & 1 \end{bmatrix}$ |
| 13 | $\begin{bmatrix} 1 \\ 1 \\ -1 \\ 1 \end{bmatrix}$ | $\frac{1}{\sqrt{2}}\begin{bmatrix} 1 & -1 \\ 1 & 1 \\ -1 & 1 \\ 1 & 1 \end{bmatrix}$ | $\frac{1}{\sqrt{3}}\begin{bmatrix} 1 & 1 & -1 \\ 1 & 1 & 1 \\ -1 & 1 & 1 \\ 1 & -1 & 1 \end{bmatrix}$ | $\frac{1}{\sqrt{4}}\begin{bmatrix} 1 & 1 & -1 & 1 \\ 1 & 1 & 1 & -1 \\ -1 & 1 & 1 & 1 \\ 1 & -1 & 1 & 1 \end{bmatrix}$ |
| 14 | $\begin{bmatrix} 1 \\ -1 \\ 1 \\ 1 \end{bmatrix}$ | $\frac{1}{\sqrt{2}}\begin{bmatrix} 1 & 1 \\ -1 & 1 \\ 1 & 1 \\ 1 & -1 \end{bmatrix}$ | $\frac{1}{\sqrt{3}}\begin{bmatrix} 1 & -1 & 1 \\ -1 & 1 & 1 \\ 1 & 1 & 1 \\ 1 & 1 & -1 \end{bmatrix}$ | $\frac{1}{\sqrt{4}}\begin{bmatrix} 1 & -1 & 1 & 1 \\ -1 & 1 & 1 & 1 \\ 1 & 1 & 1 & -1 \\ 1 & 1 & -1 & 1 \end{bmatrix}$ |
| 15 | $\begin{bmatrix} 1 \\ -1 \\ -1 \\ -1 \end{bmatrix}$ | $\frac{1}{\sqrt{2}}\begin{bmatrix} 1 & -1 \\ -1 & 1 \\ -1 & -1 \\ -1 & -1 \end{bmatrix}$ | $\frac{1}{\sqrt{3}}\begin{bmatrix} 1 & -1 & -1 \\ -1 & 1 & -1 \\ -1 & -1 & 1 \\ -1 & -1 & -1 \end{bmatrix}$ | $\frac{1}{\sqrt{3}}\begin{bmatrix} 1 & -1 & -1 & -1 \\ -1 & 1 & -1 & -1 \\ -1 & -1 & 1 & -1 \\ -1 & -1 & -1 & 1 \end{bmatrix}$ |

<Closed-Loop MIMO>

A method of using a precoding weight similar to a channel according to a channel condition is called a closed-loop MIMO scheme. A method of using a precoding weight according to a specific rule irrespective of a channel condition is called an open-loop MIMO scheme.

For the closed-loop MIMO scheme, the amount of the precoding weight reported by a receiver may vary according to a frequency unit, a report cycle, and so on. The frequency unit may be defined as a frequency range to which one precoding weight is applied. System bandwidths may be classified into frequency units, such as a wideband (WB), a subband (SB), and a bestband (BB) according to the frequency range. The subband may include at least one subcarrier, and the wideband may include at least one subband. The bestband refers to a band having the best channel state according to channel measurement in a receiver. In the codebook-based precoding scheme, a defined PMI is fed back. A WB PMI, an SB PMI, and a BB PMI may be defined according to the range to which the PMI is applied. A PMI capable of maximizing the average throughput of resources of a specific band is selected from among defined precoding matrices. The precoding weight has better performance with a reduction in the range.

Assuming that a bundle of 12 consecutive subcarriers is called a resource block, the system bandwidth and the subband may be represented by using the resource block as a basic unit. Table 3 shows an example in which the system bandwidth and the subband are represented by using the resource block as the basic unit.

TABLE 3

| System bandwidth | Subband size | M (number of bestbands) |
|---|---|---|
| 6-7 | Wideband CQI only | Wideband CQI only |
| 8-11 | 2 | 1 |
| 11-26 | 2 | 3 |
| 27-63 | 3 | 5 |
| 64-110 | 4 | 6 |

The wideband (WB) may be defined as a system bandwidth or as the greatest unit for calculating a CQI. The subband (SB) may be defined as a k number of consecutive resource blocks and as a minimum unit for calculating a CQI. The number of bestbands may be determined according to the system bandwidth.

Different subband sizes may be defined according to the system bandwidth. A CQI calculation range and a PMI application range may have the same value. For example, in a system having 24 resource blocks as the system bandwidth, a method of calculating a CQI and applying a PMI is described.

(1) In the case where a WB CQI and a WB PMI are transmitted, a receiver selects a PMI capable of maximizing the average throughput of the 24 resource blocks and calculates an average CQI of the 24 resource blocks using the selected PMI. The receiver can find one WB CQI and one WB PMI.

(2) In the case where an SB CQI and an SB PMI are transmitted, a receiver selects a PMI for subbands consisting of two resource blocks and calculates an average CQI. The receiver can find 12 SB CQIs and 12 SB PMIs.

(3) In the case where an SB CQI and a WB PMI are transmitted, a receiver selects a PMI capable of maximizing the average throughput of the 24 resource blocks and calculates an average CQI per two resource blocks using the PMI (12 CQIs/1 PMI). The receiver can find 12 SB CQIs and one WB PMI.

(4) In the case where a WB CQI and an SB PMI are transmitted, a receiver selects a PMI per two resource blocks and calculates an average CQI of the 24 resource blocks using the selected PMIs. The receiver can find one WB CQI and 12 SB PMIs.

(5) In the case where best M average CQI/PMI and WB CQI/PMI are transmitted, a receiver selects 3 subbands having the best throughput, from among subbands of two resource block unit, selects a PMI for the bestband (2×3=6RB), calculates an average CQI of the bestbands, selects a PMI for all the band 24 resource blocks, and calculates a CQI.

<Opportunistic Beamforming>

When taking scheduling in which resources are allocated to a user having almost the highest point in a channel condition into consideration, in the case where the channel of each user is in a static channel condition whose change is slow, a multi-user diversity gain is reduced. A scheme for raising the multi-user gain by making the static channel condition into a faster and greater channel condition through spatial signal processing is called an opportunistic beamforming scheme. If the opportunistic beamforming scheme is used, a BS may have an effect of forming a beam in an irregular direction by using a precoding weight having the size and phase of an irregular form in each antenna. Accordingly, a channel condition of each user can be changed more dynamically. In this case, if both the opportunistic beamforming scheme and the scheduling scheme are used in a channel condition in which a channel slowly changes, a greater multi-user diversity gain can be obtained. Furthermore, in an OFDMA system, a different precoding weight may be applied for every frequency resources. A scheduling gain may be obtained by making a frequency flat channel into a frequency selective channel. Frequency resources in an OFDMA system include a sub-block, a resource block, subcarriers, and so on.

The codebook-based precoding scheme is a method of selecting a precoding matrix which is the most similar to a channel condition, from among predetermined precoding matrices, and reporting a PMI. The codebook-based precoding scheme is advantageous in that it can reduce overhead resulting from feedback data, but it has to configure a codebook using a combination of more codebook sets with an increase of the number of transmission antennas because the codebook consists of a combination of codebook sets which can represent spatial channels. With an increase in the number of transmission antennas, there is a difficulty in designing the codebook. With an increase in the size of the codebook, the overhead of feedback data may be increased.

A method of applying the codebook-based precoding scheme to extended transmission antennas using the existing defined codebook is described below.

Figure 4:
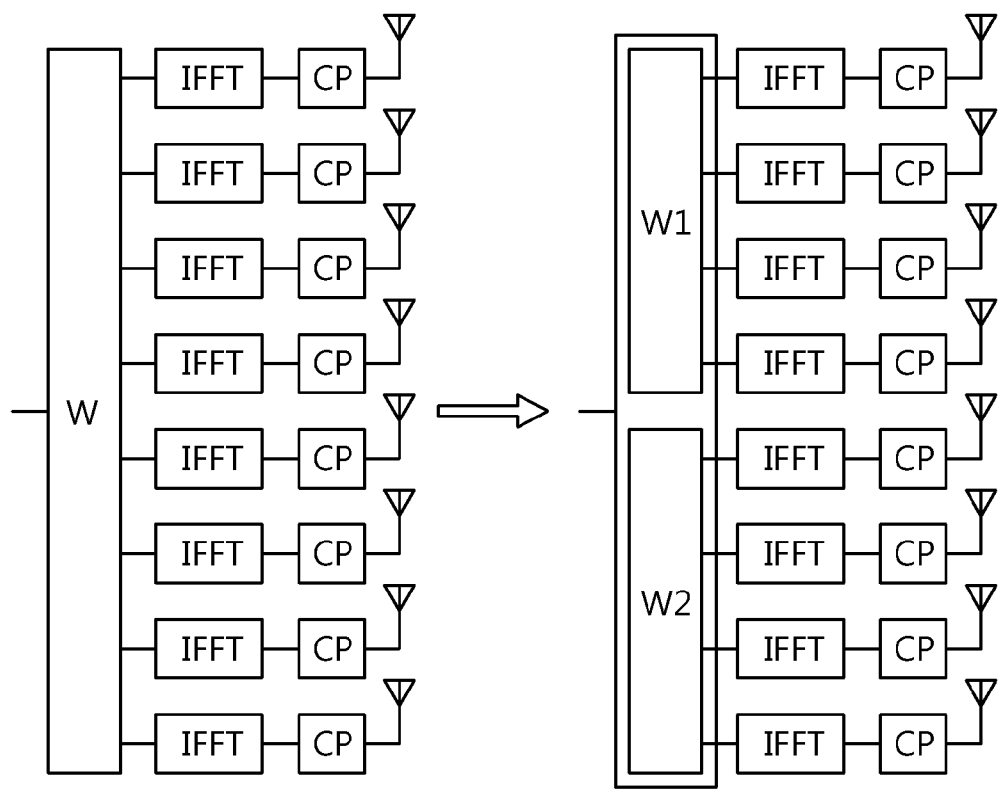
FIG. 4 shows antenna clustering according to an embodiment of the present invention.

FIG. 4 shows antenna clustering according to an embodiment of the present invention.

Referring to FIG. 4, in order to apply the codebook-based precoding scheme to extended transmission antennas, antenna clustering and channel-dependent precoding are used. When precoding weights are configured for the codebook-based precoding of a transmitter having extended antennas, some of the precoding weights may use the channel-dependent precoding using the existing codebook and the remaining precoding weights may also use the channel-dependent precoding using the existing codebook.

<Antenna Clustering and Channel-Dependent Precoding>

The antenna clustering is to configure a Z number of antenna clusters by binding a P number of transmission antennas by N (P, N, and Z are an integer greater than 0). The channel-dependent precoding may be applied to each antenna cluster. For example, as shown, in 8Tx transmission, two antenna clusters may be configured by binding four antennas. The channel-dependent precoding may be applied to each of the two antenna clusters.

The antenna cluster having an N number of the antennas can support 1 to N ranks. In each of the antenna clusters, a PMI representing a maximum throughput may be selected by using the codebook of the ranks 1 to N and used.

Equation 9 shows a precoding weight matrix including a precoding weight $W_z(i)$ having a layer whose size is $V_z$ in a $z^{th}$ antenna cluster having a $P_z$ number of transmission antennas.

$$W(i) = \begin{bmatrix} W_0(i) & 0 & \cdots & 0 \\ 0 & W_1(i) & \cdots & 0 \\ \vdots & \vdots & \ddots & \vdots \\ 0 & 0 & \cdots & W_{Z-1}(i) \end{bmatrix} \quad \text{[Equation 9]}$$

wherein $W_z(i)$ is a precoding weight $P_z \times V_z$ for the $z^{th}$ antenna cluster, $P_z$ is the number of transmission antennas for the $z^{th}$ antenna cluster, $V_z$ is the number of layers for the $z^{th}$ antenna cluster, $W(i)$ is a precoding weight P×V matrix for, the transmission antenna, $$PV = \sum_{z=0,\ldots,Z-1} V_z$$

number of transmission antennas, V is the total number of layers and, i=0, 1, . . . , $M_{symb}^{layer}-1$, and $M_{symb}^{layer}$ is the number of modulation symbols per layer. The precoding weight for each antenna cluster may be a precoding matrix previously defined in the existing system. For example, the precoding weight for each antenna cluster may be the precoding matrix of a codebook for 4Tx or 2Tx transmission which is defined in a 4Tx system.

In the $z^{th}$ antenna cluster having a $P_z$ number of the transmission antennas, if the precoding weight $W_z(i)$ having a layer having a size of $V_z$ is selected, $W_z(i)$ becomes a matrix of a $P_z \times V_z$ size. In order for a different rank to be transmitted in each antenna cluster, the precoding weight matrix of the antenna clusters has a block diagonal form. Accordingly, the precoding weight matrix used in a transmitter may become a matrix of a P×V size having a diagonal form. In the matrix of the block diagonal form, elements not 0 consist of (1,1), (2,2), (3,3) to (m,n) or (1,n), (2,n−1), (3,n−2) to (m,1) and mean matrices consisting of elements of 0 in the remaining locations (wherein m indicates the location of a row and n indicates the location of a column, m and n are an integer greater than 0).

Equation 10 shows a signal generated by an antenna cluster.

$$Y(i) = W(i)X(i) = \begin{bmatrix} W_0(i) & 0 & \cdots & 0 \\ 0 & W_1(i) & \cdots & 0 \\ \vdots & \vdots & \ddots & \vdots \\ 0 & 0 & \cdots & W_{Z-1}(i) \end{bmatrix} \begin{bmatrix} X_0(i) \\ X_1(i) \\ \vdots \\ X_{Z-1}(i) \end{bmatrix} \quad \text{[Equation 10]}$$

$$Y(i) = [y^{(0)}(i) \quad y^{(1)}(i) \quad \ldots \quad y^{(P-1)}(i)]^T$$

$$X_z(i) = [x_z^{(0)}(i) \quad x_z^{(1)}(i) \quad \ldots \quad x_z^{(V_z-1)}(i)]^T$$

The signal $X_z(i)$ having the $V_z$ layer of the $z^{th}$ antenna cluster is inputted to the precoder. The precoder generates $y^P(i)$ mapped to the $p^{th}$ antenna port. $y^P(i)$ may be represented by a vector column Y(i).

The precoding weight matrix W(i) for two antenna clusters may be represented by Equation 11.

$$W(i) = \begin{bmatrix} W_0(i) & 0 \\ 0 & W_1(i) \end{bmatrix}$$ [Equation 11]

For example, assuming a system in which four antennas are bound to form two antenna clusters in 8Tx transmission, precoding weights used in the first antenna cluster and the second antenna cluster enable transmission of the ranks 1 to 4. A rank combination of the antenna clusters may be (1,1), (1,2), (1,3), (1,4), (2,1), (2,2), (2,3), (2,4), (3,1), (3,2), (3,3), (3,4), (4,1), (4,2), (4,3), and (4,4). In order to perform different rank transmission in the two antenna clusters, the precoding weight matrix of a diagonal form is appropriate.

Equation 12 shows a case where a diagonal matrix $D(k_i)$ for Cyclic Delay Diversity (CDD) is applied in the precoding weight matrix.

$$D(k_i)W(i) = \begin{bmatrix} \theta_0 & 0 & \cdots & 0 \\ 0 & \theta_1 & \cdots & 0 \\ \vdots & \vdots & \ddots & \vdots \\ 0 & 0 & \cdots & \theta_{P-1} \end{bmatrix} W(i)$$ [Equation 12]

wherein $\theta_p = -2\pi \cdot k_i \cdot p \cdot \delta$, $p=0, \ldots, P-1$, and $k_i$ is the frequency domain index of a resource element to which a complex value symbol $y(i)$ is mapped. A phase $\theta_p$ is increased according to an increase of a frequency index $k_i$ and a transmission antenna index p, and a delay value $\delta$ may be defined as in Table 4.

TABLE 4

|   | 2Tx | 4Tx | 8Tx |
|---|---|---|---|
| 1 | 2/η | 1/η | — |
| 2 | 4/η | 2/η | 1/η |
| η = {128, 256, 512, 1024, 2048} | | | | wherein η may have the same value as the FFT size of a system bandwidth or fixedly one of five values irrespective of a system bandwidth.

The diversity diagonal matrix D(i) may be represented by a combination of $D_z(i)$ defined for each antenna cluster and may be represented by Equation 13.

$$D(i)W(i) = \begin{bmatrix} D_0(i) & 0 & \cdots & 0 \\ 0 & D_1(i) & \cdots & 0 \\ \vdots & \vdots & \ddots & \vdots \\ 0 & 0 & \cdots & D_{z-1}(i) \end{bmatrix}$$ [Equation 13]

$$\begin{bmatrix} W_0(i) & 0 & \cdots & 0 \\ 0 & W_1(i) & \cdots & 0 \\ \vdots & \vdots & \ddots & \vdots \\ 0 & 0 & \cdots & W_{z-1}(i) \end{bmatrix}$$

$$D_z(i) = \begin{bmatrix} \theta_0 & 0 & \cdots & 0 \\ 0 & \theta_1 & \cdots & 0 \\ \vdots & \vdots & \ddots & \vdots \\ 0 & 0 & \cdots & \theta_{P-1} \end{bmatrix}$$

wherein $\theta_p = -2\pi \cdot k_i \cdot p \cdot \delta$, $p=0, \ldots, P_z-1$

The delay diagonal matrix $D_z(i)$ and a Discrete Fourier Transform (DFT) unitary matrix $U_z$ for each antenna cluster may be defined using a precoding spatial multiplex (SM) scheme using wide delay CDD.

Equation 14 shows a case where the DFT unitary matrix $U_z$ is applied to a precoding weight matrix.

$$W(i)D(i)U = \begin{bmatrix} W_0(i) & 0 & \cdots & 0 \\ 0 & W_1(i) & \cdots & 0 \\ \vdots & \vdots & \ddots & \vdots \\ 0 & 0 & \cdots & W_{z-1}(i) \end{bmatrix}$$ [Equation 14]

$$\begin{bmatrix} D_0(i) & 0 & \cdots & 0 \\ 0 & D_1(i) & \cdots & 0 \\ \vdots & \vdots & \ddots & \vdots \\ 0 & 0 & \cdots & D_{z-1}(i) \end{bmatrix} \begin{bmatrix} U_0 & 0 & \cdots & 0 \\ 0 & U_1 & \cdots & 0 \\ \vdots & \vdots & \ddots & \vdots \\ 0 & 0 & \cdots & U_{z-1} \end{bmatrix}$$

$$D_z(i) = \begin{bmatrix} 1 & 0 & \cdots & 0 \\ 0 & e^{-j2\pi i/V} & \cdots & 0 \\ \vdots & \vdots & \ddots & \vdots \\ 0 & 0 & \cdots & e^{-j(V-1)2\pi i/V} \end{bmatrix}$$

$$U_s = DFT_V$$

wherein $V_z$ is the number of layers of the $z^{th}$ antenna cluster, and the sizes of $D_z(i)$ and $U_z$ may be determined according to the number of layers $V_z$ of the $z^{th}$ antenna cluster. The precoding matrix $W_z(i)$ of the $z^{th}$ antenna cluster may be circularly selected according to the frequency index.

The sizes of the delay diagonal matrix D(i) and the unitary DFT matrix U may be determined by the sum of layers transmitted from antenna clusters and may be represented by Equation 15.

$$W(i)D(i)U = \begin{bmatrix} W_0(i) & 0 & \cdots & 0 \\ 0 & W_1(i) & \cdots & 0 \\ \vdots & \vdots & \ddots & \vdots \\ 0 & 0 & \cdots & W_{z-1}(i) \end{bmatrix} D(i)U$$ [Equation 15]

$$D(i) = \begin{bmatrix} 1 & 0 & \cdots & 0 \\ 0 & e^{-j2\pi i/V} & \cdots & 0 \\ \vdots & \vdots & \ddots & \vdots \\ 0 & 0 & \cdots & e^{-j(V-1)2\pi i/V} \end{bmatrix}$$

$$U = DFT_V$$

wherein V is the total number of layers, and the precoding matrix $W_z(i)$ may be circularly selected according to the frequency index as in Equation 14.

Physical antennas to which antenna clusters are mapped may be selected using an antenna switching matrix. They may be represented by Equation 16.

$$AW(i)$$ [Equation 16]

wherein A is the antenna switching matrix P×P, and W(i) is the precoding matrix P×V.

The antenna switching matrix may produce a P! type of a matrix. For example, assuming a system having 8Tx, the type of the antenna switching matrix may become 8! so that the precoding weight is mapped to the physical antenna.

Equation 17 shows an example of physical antenna switching matrices $A_0$ to $A_3$ to which the precoding weight is mapped.

$$A_0 = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix}$$ [Equation 17]

$$A_1 = \begin{bmatrix} 1 & 0 & 0 & 0 & 0 & 0 & 0 & 0 \\ 0 & 0 & 0 & 0 & 1 & 0 & 0 & 0 \\ 0 & 1 & 0 & 0 & 0 & 0 & 0 & 0 \\ 0 & 0 & 0 & 0 & 0 & 1 & 0 & 0 \\ 0 & 0 & 1 & 0 & 0 & 0 & 0 & 0 \\ 0 & 0 & 0 & 0 & 0 & 0 & 1 & 0 \\ 0 & 0 & 0 & 1 & 0 & 0 & 0 & 0 \\ 0 & 0 & 0 & 0 & 0 & 0 & 0 & 1 \end{bmatrix}$$

$$A_2 = \begin{bmatrix} 0 & 0 & 0 & 1 & 0 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \end{bmatrix}$$

$$A_3 = \begin{bmatrix} 0 & 0 & 0 & 1 & 0 & 0 & 0 & 0 \\ 1 & 0 & 0 & 0 & 0 & 0 & 0 & 0 \\ 0 & 0 & 0 & 0 & 0 & 1 & 0 & 0 \\ 0 & 1 & 0 & 0 & 0 & 0 & 0 & 0 \\ 0 & 0 & 0 & 0 & 0 & 0 & 1 & 0 \\ 0 & 0 & 1 & 0 & 0 & 0 & 0 & 0 \\ 0 & 0 & 0 & 0 & 0 & 0 & 0 & 1 \\ 0 & 0 & 0 & 1 & 0 & 0 & 0 & 0 \end{bmatrix}$$

The physical antenna switching matrices $A_0$ to $A_3$ indicate the physical antennas to which the precoding weight is mapped. Accordingly, the numbers of mapped physical antennas may be represented as in Table 5.

TABLE 5

| | Antenna Cluster #1 | Antenna Cluster #2 |
|---|---|---|
| $A_0$ | 1, 2, 3, 4 | 5, 6, 7, 8 |
| $A_1$ | 1, 3, 5, 7 | 2, 4, 6, 8 |
| $A_2$ | 5, 6, 7, 8 | 1, 2, 3, 4 |
| $A_3$ | 2, 4, 6, 8 | 1, 3, 5, 7 |

In the case of $A_0$, the antenna cluster #1 is mapped to the 1, 2, 3, and $4^{th}$ antennas, and the antenna cluster #2 is mapped to the 5, 6, 7, and $8^{th}$ antennas. In the case of $A_1$, the antenna cluster #1 is mapped to 1, 3, 5, and $7^{th}$ antennas, and the antenna cluster #2 is mapped to 2, 4, 6, and $8^{th}$ antennas. $A_2$ and $A_3$ have a swapping relationship with $A_0$ and $A_1$, respectively.

Equation 18 may be represented by combining Equations 12, 13, and 16.

$$AD(i)W(i) \quad \text{[Equation 18]}$$

The location of an antenna clustered from among all the P antennas is determined by a matrix A.

Equation 19 may be represented by combining Equations 14, 15, and 16.

$$AW(i)D(i)U \quad \text{[Equation 19]}$$

The location of an antenna clustered from among all the P antennas is determined by a matrix A.

Equation 20 represents the data of each antenna cluster in rank 1 transmission.

$$X_0(i) = X_1(i) = \ldots = X_{Z-1}(i)$$

$$V_z = 1$$

$$z = 0, \ldots, Z-1 \quad \text{[Equation 20]}$$

In rank 1 transmission, the number of layers of all the antenna clusters is 1, and the same data is transmitted. A Z number of PMIs for a Z number of antenna clusters and one CQI are required as feedback data.

Equation 21 shows an example of data in which the precoding weight is applied to two antenna clusters having 4Tx antennas in 8Tx transmission.

$$W(i)X(i) = \begin{bmatrix} W_{00}(i) & 0 \\ W_{01}(i) & 0 \\ W_{02}(i) & 0 \\ W_{03}(i) & 0 \\ 0 & W_{10}(i) \\ 0 & W_{11}(i) \\ 0 & W_{12}(i) \\ 0 & W_{13}(i) \end{bmatrix} \begin{bmatrix} X_0(i) \\ X_1(i) \end{bmatrix}, X_0(i) = X_1(i) \quad \text{[Equation 21]}$$

Assuming two antenna clusters having 4Tx in 8Tx transmission, a PMI for each of the two antenna clusters is selected every antenna cluster. A weight capable of maximizing the throughput of 8Tx rank 1 transmission is selected as the two PMIs. The throughput may be calculated on the basis of the SNR. The SNR may be calculated as in Equation 22.

$$HW = \begin{bmatrix} \hat{H}_0 & \hat{H}_1 \end{bmatrix} \begin{bmatrix} \hat{W}_0 & 0_{4\times 1} \\ 0_{4\times 1} & \hat{W}_1 \end{bmatrix}$$

$$= \begin{bmatrix} \hat{H}_0 \hat{W}_0 & 0 \\ 0 & \hat{H}_1 \hat{W}_1 \end{bmatrix} = \begin{bmatrix} \tilde{H}_0 & 0 \\ 0 & \tilde{H}_1 \end{bmatrix}$$

$$SNR = \frac{|\tilde{H}_0|^2 + |\tilde{H}_1|^2}{\sigma^2}$$

$$\hat{H}_0 = [H_0 \quad H_1 \quad H_2 \quad H_3],$$

$$\hat{H}_1 = [H_4 \quad H_5 \quad H_6 \quad H_7]$$

$$\hat{W}_0 = [W_{00} \quad W_{01} \quad W_{02} \quad W_{03}]^T,$$

$$\hat{W}_1 = [W_{10} \quad W_{11} \quad W_{12} \quad W_{13}]^T$$

$$\tilde{H}_0 = H_0 W_{00} + H_1 W_{01} + H_2 W_{02} + H_3 W_{03}$$

$$\tilde{H}_1 = H_4 W_{10} + H_5 W_{11} + H_6 W_{12} + H_7 W_{13}$$

[Equation 22]

Here, when the antenna clusters have the same number of layers, the precoding weight matrix may be represented by Equation below.

$$W(i) = \begin{bmatrix} aW_0(i) & bW_1(i) \\ cW_2(i) & dW_3(i) \end{bmatrix} \quad \text{[Equation 23]}$$

wherein a, b, c, and d are weight factors for configuring the precoding weight matrix in various ways. The weight factor may be a specific complex scalar value. In order to simplify the precoding operation, the weight factor may be limitedly used. A codebook may be configusing a predetermined weight factor. For example, the weight factor may be $$\frac{\pm 1 \pm j}{\sqrt{2}}$$

±1, and ±j of ±1, ±j or 8PSK of QPSK. Accordingly, finally, the codebook W(i) may consist of the weight factor of QPSK or 8PSK. W(i) may be configured as in $W(i)W^{(H)}(i)=W^H(i)W(i)=I$. The weight factor may have a determined value so that it is power normalized.

Some of the precoding weight matrices may be the same. For example, the precoding weight matrices may be configured as $W_0(i)=W_1(i)$, $W_2(i)=W_3(i)$ or $W_0(i)=W_2(i)$, $W_1(i)=W_3(i)$.

Equation 24 represents a precoding weight matrix when a=1, b=1, c=1, d=−1, and W0(i)=W1(i), W2(i)=W3(i).

$$W(i) = \begin{bmatrix} W_0(i) & W_0(i) \\ W_1(i) & -W_1(i) \end{bmatrix}$$ [Equation 24]

Equation 25 represents a precoding weight matrix when a=1, b=1, c=1, and d=−1 and $W_0(i)=W_2(i)$, $W_1(i)=W_3(i)$.

$$W(i) = \begin{bmatrix} W_0(i) & W_1(i) \\ W_0(i) & -W_1(i) \end{bmatrix}$$ [Equation 25]

Equation 26 represents a precoding weight matrix when a=1, b=1, c=j, and d=−j and $W_0(i)=W_1(i)$, $W_2(i)=W_3(i)$.

$$W(i) = \begin{bmatrix} W_0(i) & W_0(i) \\ jW_1(i) & -jW_1(i) \end{bmatrix}$$ [Equation 26]

Equation 27 represents a precoding weight matrix when a=1, b=1, c=j, and d=−j and $W_0(i)=W_2(i)$, $W_1(i)=W_3(i)$.

$$W(i) = \begin{bmatrix} W_0(i) & W_1(i) \\ jW_0(i) & -jW_1(i) \end{bmatrix}$$ [Equation 27]

Equation 28 represents a precoding weight matrix when a=1, b=j, c=1, and d=−j and $W_0(i)=W_1(i)$, $W_2(i)=W_3(i)$.

$$W(i) = \begin{bmatrix} W_0(i) & jW_0(i) \\ W_1(i) & -jW_1(i) \end{bmatrix}$$ [Equation 28]

Equation 29 represents a precoding weight matrix when a=1, b=j, c=1, and d=−j and $W_0(i)=W_2(i)$, $W_1(i)=W_3(i)$.

$$W(i) = \begin{bmatrix} W_0(i) & jW_1(i) \\ W_0(i) & -jW_1(i) \end{bmatrix}$$ [Equation 29]

Some of the precoding weight matrices may become complex-conjugated. Equation 30 to 33 shows an example of a complex conjugated precoding weight matrix $$W(i) = \begin{bmatrix} W_0(i) & 0 \\ 0 & W_1(i) \end{bmatrix} \begin{bmatrix} I & I \\ I & -I \end{bmatrix}$$ [Equation 30]

$$W(i) = \begin{bmatrix} W_0(i) & 0 \\ 0 & W_1(i) \end{bmatrix} \begin{bmatrix} aI & bI \\ cI & dI \end{bmatrix}$$ [Equation 31]

$$W(i) = \begin{bmatrix} I & I \\ I & -I \end{bmatrix} \begin{bmatrix} W_0(i) & 0 \\ 0 & W_1(i) \end{bmatrix}$$ [Equation 32]

$$W(i) = \begin{bmatrix} aI & bI \\ cI & dI \end{bmatrix} \begin{bmatrix} W_0(i) & 0 \\ 0 & W_1(i) \end{bmatrix}$$ [Equation 33]

A diagonal matrix D(i) and/or a DFT unitary matrix U(i) for CDD may be applied to the complex conjugated precoding weight matrix. Equation 34 to 36 show examples in which the diagonal matrix D(i) is applied to the complex conjugated precoding weight matrix.

$$W(i) = \begin{bmatrix} W_0(i) & 0 \\ 0 & W_1(i) \end{bmatrix} D(i) \begin{bmatrix} I & I \\ I & -I \end{bmatrix}$$ [Equation 34]

$$W(i) = \begin{bmatrix} W_0(i) & 0 \\ 0 & W_1(i) \end{bmatrix} D(i) \begin{bmatrix} aI & bI \\ cI & dI \end{bmatrix}$$ [Equation 35]

$$W(i) = \begin{bmatrix} aW_0(i) & bW_1(i) \\ cW_2(i) & dW_3(i) \end{bmatrix} D(i)$$ [Equation 36]

Equation 37 shows an example in which the DFT unitary matrix is applied to the complex conjugated precoding weight matrix.

$$W(i) = \begin{bmatrix} W_0(i) & 0 \\ 0 & W_1(i) \end{bmatrix} [U(i)]$$ [Equation 37]

$$U(i) = I \otimes W_2(i)$$

wherein $W_2(i)$ is a unitary matrix.

Equation 38 shows an example in which the diagonal matrix D(i) and the DFT unitary matrix U(i) are applied to the complex conjugated precoding weight matrix.

$$W(i) = \begin{bmatrix} W_0(i) & 0 \\ 0 & W_1(i) \end{bmatrix} D(i)[U(i)]$$ [Equation 38]

The complex conjugated precoding weight matrix and the unitary matrix may be represented by Equation 39.

$$W(i) = \left\{ \frac{1}{2} \begin{bmatrix} W_0(i) & W_0(i) \\ W_1(i) & -W_1(i) \end{bmatrix}, \frac{1}{2} \begin{bmatrix} W_0(i) & W_0(i) \\ jW_1(i) & -jW_1(i) \end{bmatrix} \right\}$$ [Equation 39]

$$W_2(i) = \left\{ \frac{1}{2} \begin{bmatrix} 1 & 1 \\ 1 & -1 \end{bmatrix}, \frac{1}{2} \begin{bmatrix} 1 & 1 \\ j & -j \end{bmatrix} \right\}$$

The complex conjugated precoding weight matrix may be represented by Equation 40.

$$W(i) = \begin{bmatrix} W_0(i) \\ W_1(i) \end{bmatrix}$$ [Equation 40]

If the weight factor of a complex scalar value is applied, the precoding weight matrix may be represented by Equation 41. In order to simplify the precoding operation, the weight factor may be predetermined.

$$W(i) = \begin{bmatrix} aW_0(i) \\ bW_1(i) \end{bmatrix} \quad \text{[Equation 41]}$$

$W_1(i)$ may be $W_0(i)$. Accordingly, the complex conjugated precoding weight matrix may be represented by Equation 42.

$$W(i) = \begin{bmatrix} aW_0(i) \\ bW_0(i) \end{bmatrix} \quad \text{[Equation 42]}$$

Assuming that a=1, b=1 and $W_0(i)=W_1(i)$, the complex conjugated precoding weight matrix may be represented by Equation 43.

$$W(i) = \begin{bmatrix} W_0(i) \\ W_0(i) \end{bmatrix} \quad \text{[Equation 43]}$$

Assuming that a=1, b=−1 and $W_0(i)=W_1(i)$, the complex conjugated precoding weight matrix may be represented by Equation 44.

$$W(i) = \begin{bmatrix} W_0(i) \\ -W_0(i) \end{bmatrix} \quad \text{[Equation 44]}$$

Assuming that a=1, b=j and $W_0(i)=W_1(i)$, the complex conjugated precoding weight matrix may be represented by Equation 45.

$$W(i) = \begin{bmatrix} W_0(i) \\ jW_0(i) \end{bmatrix} \quad \text{[Equation 45]}$$

Assuming that a=1, b=−j and $W_0(i)=W_1(i)$, the complex conjugated precoding weight matrix may be represented by Equation 46.

$$W(i) = \begin{bmatrix} W_0(i) \\ -jW_0(i) \end{bmatrix} \quad \text{[Equation 46]}$$

The precoding weight matrix and the unitary matrix may be represented by Equation 47.

$$W(i) = \left\{ \frac{1}{\sqrt{2}} \begin{bmatrix} W_0(i) \\ W_1(i) \end{bmatrix}, \frac{1}{\sqrt{2}} \begin{bmatrix} W_0(i) \\ -W_1(i) \end{bmatrix}, \right.$$
$$\left. \frac{1}{\sqrt{2}} \begin{bmatrix} W_0(i) \\ jW_1(i) \end{bmatrix}, \frac{1}{\sqrt{2}} \begin{bmatrix} W_0(i) \\ -jW_1(i) \end{bmatrix} \right\} \quad \text{[Equation 47]}$$
$$W_2(i) = \left\{ \frac{1}{\sqrt{2}} \begin{bmatrix} 1 \\ 1 \end{bmatrix}, \frac{1}{\sqrt{2}} \begin{bmatrix} 1 \\ -1 \end{bmatrix}, \frac{1}{\sqrt{2}} \begin{bmatrix} 1 \\ j \end{bmatrix}, \frac{1}{\sqrt{2}} \begin{bmatrix} 1 \\ -j \end{bmatrix} \right\}$$

In at least one of Equations 24 to 47, $W_0(i)$ and $W_1(i)$ may be $W_0(i)=W_1(i)$. Accordingly, an indicator to indicate $W_0(i)$ or $W_1(i)$ as feedback information may be used. Here, the complex conjugated precoding weight matrix of Equation 39 may be represented by Equation 48.

$$W(i) = W_0(i) I_n I_n \otimes W_2(i) = W_0(i) \otimes W_2(i) \quad \text{[Equation 48]}$$

As described above, since the multiple extended antennas of an advanced system can be supported using the existing codebook, the complexity of the system can be reduced. Furthermore, the existing codebook can be used for the UEs of the existing system not supporting multiple extended antennas, and backward compatibility for the existing system can be guaranteed. A UE may operate in a multiple antenna system, estimate a plurality of transmission antenna channels of a BS, feed a channel-dependent precoding matrix or PMI for a first cluster and a second cluster, each including a plurality of different antennas, from the estimated channels back to the BS, and receive precoded and transmitted data using a feedback precoding matrix or a precoding weight induced from a PMI or directly used.

All the above functions may be executed by a processor, such as a microprocessor, a controller, a microcontroller, an Application Specific Integrated Circuit (ASIC) according to software or program codes coded to perform the above functions. The design, development, and implementation of the codes may be said to be evident to a person having ordinary skill in the art on the basis of the description of the present invention.

Although the embodiments of the present invention have been described above, those having ordinary skill in the art will appreciate that the present invention may be modified in various ways without departing from the technical spirit and scope of the present invention. Accordingly, it may be said that the present invention is not limited to the embodiments and includes all embodiments falling within the scope of the claims.

The invention claimed is:

1. A method for transmitting a signal in a multiple antenna system, the method performed by a transmitter and comprising:
   pre-coding the signal based on a codebook comprising first pre-coding matrices; and
   transmitting the pre-coded signal using a radio resource,
   wherein each of the first pre-coding matrices is configured in a form of a matrix, which is $$\begin{bmatrix} W_0(i) \\ W_0(i) \end{bmatrix}, \begin{bmatrix} W_0(i) \\ -W_0(i) \end{bmatrix}, \begin{bmatrix} W_0(i) \\ jW_0(i) \end{bmatrix} \text{ or } \begin{bmatrix} W_0(i) \\ -jW_0(i) \end{bmatrix},$$

wherein $W_0(i)$ denotes a second pre-coding matrix,
   wherein i denotes an index for the radio resource, and
   wherein each of the first pre-coding matrices has 8 rows and the second pre-coding matrix has 4 rows.

2. The method of claim 1, wherein each of the first pre-coding matrices is for a first number of antennas, the second pre-coding matrix has a second number of rows, and the first number is greater than the second number.

3. The method of claim 1, wherein the first pre-coding matrices comprise a weight factor determined so that a transmit power of a first number of antennas is normalized.

4. The method of claim 1, wherein the radio resource comprises at least one Orthogonal Frequency Division Multiplexing (OFDM) symbol.

5. A transmitter comprising:
   a pre-coder for pre-coding the signal based on a codebook, the codebook comprising first pre-coding matrices; and a radio frequency unit for transmitting the pre-coded signal using a radio resource,
wherein each of the first pre-coding matrices is configured in a form of a matrix, which is $$\begin{bmatrix} W_0(i) \\ W_0(i) \end{bmatrix}, \begin{bmatrix} W_0(i) \\ -W_0(i) \end{bmatrix}, \begin{bmatrix} W_0(i) \\ jW_0(i) \end{bmatrix} \text{ or } \begin{bmatrix} W_0(i) \\ -jW_0(i) \end{bmatrix},$$

wherein $W_0(i)$ denotes a second pre-coding matrix,
wherein i denotes an index for the radio resource, and
wherein each of the first pre-coding matrices has 8 rows and the second pre-coding matrix has 4 rows.

6. The transmitter of claim 5, wherein each of the first pre-coding matrices is for a first number of antennas, the second pre-coding matrix has a second number of rows, and the first number is greater than the second number.

7. The transmitter of claim 5, wherein the first pre-coding matrices comprise a weight factor determined so that a transmit power of a first number of antennas is normalized.

8. The transmitter of claim 5, wherein the radio resource comprises at least one Orthogonal Frequency Division Multiplexing (OFDM) symbol.

9. A transmitter comprising:
a pre-coder for pre-coding a signal based on a codebook, the codebook comprising first pre-coding matrices; and
a radio frequency unit for transmitting the pre-coded signal using a radio resource,
wherein each of the first pre-coding matrices is configured in a form of a matrix, which is $$\begin{bmatrix} W \\ W \end{bmatrix}, \begin{bmatrix} W \\ -W \end{bmatrix}, \begin{bmatrix} W \\ jW \end{bmatrix} \text{ or } \begin{bmatrix} W \\ -jW \end{bmatrix},$$

wherein W denotes a second pre-coding matrix, and
wherein each of the first pre-coding matrices has 8 rows and the second pre-coding matrix has 4 rows.

* * * * *